(12) United States Patent
Dai et al.

(10) Patent No.: US 10,550,318 B1
(45) Date of Patent: Feb. 4, 2020

(54) SKID-MOUNTED DISPERSED PARTICLE GEL PRODUCTION DEVICE, DISPERSED PARTICLE GEL AND PREPARATION METHOD AND USE THEREOF

(71) Applicants: China University of Petroleum (East China), Qingdao (CN); Oil and Gas Technology Research Institute, PetroChina Changqing Oilfield Company, Xi'an (CN); China University of Geosciences (Beijing), Beijing (CN); Northwest Oilfield Branch Engineering Technology Research Institute, Sinopec Group, Urumqi, Xinjiang Uygur Autonomous Region (CN)

(72) Inventors: Caili Dai, Qingdao (CN); Guang Zhao, Qingdao (CN); Haien Yang, Xi'an (CN); Ping Yi, Xi'an (CN); Sen Wang, Qingdao (CN); Qing You, Beijing (CN); Long He, Urumqi (CN); Mingwei Zhao, Qingdao (CN); Yining Wu, Qingdao (CN)

(73) Assignees: CHINA UNIVERSITY OF PETROLEUM (EAST CHINA), Qingdao (CN); OIL AND GAS TECHNOLOGY RESEARCH INSTITUTE, PETROCHINA CHANGQING OILFIELD COMPANY, Xi'an (CN); CHINA UNIVERSITY OF GEOSCIENCES (BEIJING), Beijing (CN); NORTHWEST OILFIELD BRANCH ENGINEERING TECHNOLOGY RESEARCH INSTITUTE, SINOPEC GROUP, Urumqi (CN)

( * ) Notice: Subject to any disclaimer, the term of this patent is extended or adjusted under 35 U.S.C. 154(b) by 0 days.

(21) Appl. No.: 16/396,010

(22) Filed: Apr. 26, 2019

(30) Foreign Application Priority Data

Oct. 31, 2018 (CN) .......................... 2018 1 1288180

(51) Int. Cl.
*C09K 8/88* (2006.01)
*C08J 3/00* (2006.01)
*C08J 3/075* (2006.01)

(52) U.S. Cl.
CPC ............... *C09K 8/887* (2013.01); *C08J 3/005* (2013.01); *C08J 3/075* (2013.01); *C08J 2333/26* (2013.01)

(58) Field of Classification Search
None
See application file for complete search history.

(56) References Cited

U.S. PATENT DOCUMENTS 4,524,829 A * 6/1985 Hanlon .................... C09K 8/08
                                                           166/270
4,606,772 A * 8/1986 Almond ................. C09K 8/887
                                                           106/181.1

(Continued)

FOREIGN PATENT DOCUMENTS

| CN | 102936490 A | 2/2013 |
| CN | 102996106 B | 2/2014 |

*Primary Examiner* — John J Figueroa
(74) *Attorney, Agent, or Firm* — Volpe and Koenig, P.C.

(57) ABSTRACT

Provided a skid-mounted dispersed particle gel production device, dispersed particle gel and a preparation method and use thereof. The device sequentially comprises, in a delivery direction of a material flow, a jet blending system, a bulk gel chemical crosslinking reaction system, a shearing and grinding system, a storage system. and an intelligent regulation system Rapid crosslinking reaction of bulk gel in a medium/high-temperature oil reservoir and large-scale preparation of (Continued)

multiscale dispersed particle gel can be realised, and the device is applied to continuous production in a complex environment such as a tidal flat, a hill and an offshore work platform.

17 Claims, 1 Drawing Sheet

(56) References Cited

U.S. PATENT DOCUMENTS

| | | | | |
|---|---|---|---|---|
| 4,676,930 A * | 6/1987 | Shu | ........................ | C09K 8/588 |
| | | | | 166/294 |
| 2016/0333680 A1* | 11/2016 | Richter | ................... | E21B 43/26 |
| 2019/0145237 A1* | 5/2019 | Shampine | ............... | F04F 13/00 |

* cited by examiner

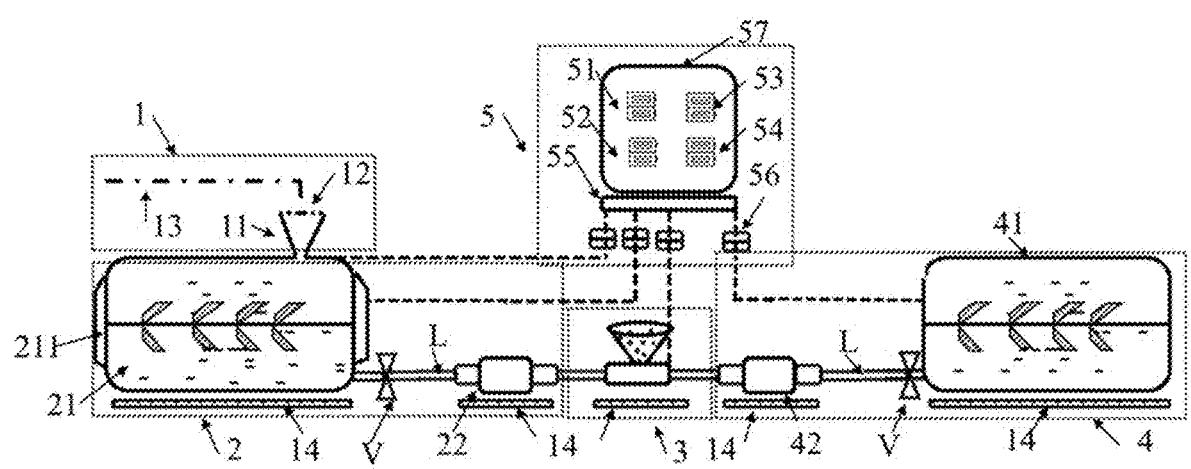

SKID-MOUNTED DISPERSED PARTICLE GEL PRODUCTION DEVICE, DISPERSED PARTICLE GEL AND PREPARATION METHOD AND USE THEREOF

CROSS REFERENCE TO RELATED APPLICATIONS

This application claims priority to Chinese Application No. 201811288180.2, filed on Oct. 31, 2018, entitled "Skid-mounted Dispersed particle gel Production Device, Dispersed particle gel and Preparation Method and Use Thereof", which is specifically and entirely incorporated by reference.

FIELD OF THE INVENTION

The present invention relates to the field of oilfield profile control and displacement, in particular to a skid-mounted dispersed particle gel production device, dispersed particle gel and a preparation method and application thereof.

BACKGROUND OF THE INVENTION

Reservoir heterogeneity is a main factor influencing efficient oil reservoir development. For improving a water drive development effect of an oil reservoir in middle and later periods, it is necessary to regulate the heterogeneity of a stratum. In various process measures, injecting a polymer, or a polymer-based binary/ternary composite flooding system, gel, a polymer microsphere and the like is important technical means for regulating the oil reservoir. However, the technical measures have some problems in an oil reservoir mine implementation process. Factors such as shearing of a ground surface injection device, shearing of stratum seepage, physical and chemical properties (temperature, mineralization degree, pH value and the like) of the stratum and stratum water dilution result in relatively high loss in viscosity of polymer-based binary/ternary composite flooding system, gel, a polymer microsphere and the like, weakening of a fluidity control capability, relatively fast injection pressure reduction particularly in a subsequent water drive stage and difficulties in achieving a long-term effective regulation effect. For a polymer-based gel system, under the influence of shearing and dilution actions, an effective concentration of the polymer injected into a gel forming solution of the stratum is decreased, and the polymer is structurally damaged, so that gel forming time of the gel is indeterminate, a gel forming intensity is reduced, and the regulation effect is reduced; and particularly for a low-permeability oil reservoir, a shearing effect is more obvious. The polymer microsphere is prepared from monomer acrylamide (AM), and is poor in environment friendliness, and a preparation process is relatively complex and high in cost.

In view of the problems of above regulating agent and in combination of the characteristic of controllability of an oilfield, a method for preparing an environment-friendly multiscale zirconium dispersed particle gel blocking agent is disclosed in CN102936490A. According to the method, a certain crosslinking technology and dispersion technology are adopted, and an aqueous dispersion solution distributed with different particle sizes is prepared from bulk gel formed on the ground surface after a mechanical shearing action. The multiscale dispersed particle gel particle has high viscoelasticity, in a stratum, it may change shape according to size and shape changes of an aperture, and then migrate to a deep part along, it also may avoid the influence of ground surface shearing, shearing of subsurface seepage and physical and chemical properties, which are however suffered by a polymer type regulation system, so the multiscale dispersed particle gel particle can meet a large-scale industrial production requirement, and is environment-friendly. Nanoscale, micron-scale and millimeter-scale zirconium dispersed particle gel obtained by the method can enter the deep part of the stratum through their own particle sizes and be gathered and expanded at the deep part of the stratum, can effectively regulate a water injection profile of the stratum, and has a relatively high fluidity control capability. However, the formed zirconium bulk gel has poor viscoelasticity, An integrated dispersed particle gel continuous online production and injection method is disclosed in CN102996106B. The method includes two parts, i.e., dispersed particle gel production and injection, and industrial workshop production of dispersed particle gel and rapid well field injection may be implemented. Based on the method, a multiscale dispersed particle gel production process may be regulated to implement integration of production and injection of the dispersed particle gel. However, the process of the present invention mainly involves industrial workshop production of the dispersed particle gel, and for a complex environment such as a tidal flat, a hill and an offshore work platform, long-distance transportation, high packaging cost and the like greatly increase operation cost in deep profile control (profile control) of the dispersed particle gel and limit large-scale application of the dispersed particle gel to a complex oil reservoir. In addition, chemical reaction of the bulk gel involved in the patent is only performed at room temperature, it is difficult to implement reaction of a medium/high-temperature bulk gel system, and a using requirement of a medium/high-temperature high-salt oil reservoir may not be met.

SUMMARY OF THE INVENTION

An objective of the present invention is to provide a skid-mounted dispersed particle gel production device, dispersed particle gel and a preparation method and use thereof, which can implement rapid crosslinking reaction of bulk gel in a high-temperature oil reservoir and implement large-scale preparation of multiscale dispersed particle gel and are suitable for continuous production in a complex environment such as a tidal flat, a hill and an offshore work platform.

In order to achieve the above objective, a first aspect of the present invention provides a skid-mounted dispersed particle gel production device, sequentially comprising, in a delivery direction of a material flow, a jet blending system, a bulk gel chemical crosslinking reaction system, a shearing and grinding system and a storage system, wherein the jet blending system is configured to deliver a dispersed particle gel production raw material and liquid water into the bulk gel chemical crosslinking reaction system in a jet manner and perform reaction to obtain a pre-dispersed particle gel;

the shearing and grinding system is configured to receive the pre-dispersed particle gel from the bulk gel chemical crosslinking reaction system and grind and shear it to obtain dispersed particle gel;

the storage system is configured to receive the dispersed particle gel from the shearing and grinding system and store it;

wherein the device further comprises an intelligent regulation system, configured to regulate the jet blending system, the bulk gel chemical crosslinking reaction system, the shearing and grinding system and the storage system; and wherein the bulk gel chemical crosslinking reaction system comprises a reaction tank, and a heating device is further arranged in the reaction tank.

A second aspect of the present invention provides a preparation method for dispersed particle gel, comprising:

(1) delivering partially hydrolyzed polyacrylamide and liquid water into a jet blending system, then jetting them into a bulk gel chemical crosslinking reaction system and mixing them to obtain an aqueous solution of the partially hydrolyzed polyacrylamide;

(2) delivering a crosslinking agent, a coagulant and a stabilizer into the jet blending system and jetting them into the bulk gel chemical crosslinking reaction system to allow contact with the aqueous solution of the partially hydrolyzed polyacrylamide to obtain a bulk gel forming solution;

(3) increasing temperature to a predetermined temperature by use of a heating device in the bulk gel chemical crosslinking reaction system, and aging the obtained bulk gel forming solution at the predetermined temperature to obtain pre-dispersed particle gel; and (4) performing primary shearing on the obtained pre-dispersed particle gel in a shearing and grinding system to obtain the dispersed particle gel, wherein a relative molecular weight of the partially hydrolylzed polyacrylamide is 6-10 million; and the crosslinking agent is a resin crosslinking agent, the coagulant is an alcohol amine coagulant, and the stabilizer is thiourea.

A third aspect of the present invention provides a method for oilfield profile control and displacement, comprising during a process of oilfield profile control and displacement, using the dispersed particle gel prepared according to above method.

The present invention may have the following beneficial effects.

(1) The device of the present invention is skid-mounted, and may be used for continuous production of the dispersed particle gel in a complex environment such as a tidal flat, a hill and an offshore work platform, and the shortcomings of difficulties in transportation and high packaging cost are overcome.

(2) The skid-mounted dispersed particle gel production device provided by the present invention is simple in structure, and the systems are all arranged on a skid to facilitate movement of the device, and during usage, only connecting pipelines and cables is needed to meet skid-mounted online continuous production of the dispersed particle gel.

(3) The skid-mounted dispersed particle gel production device provided by the present invention is convenient to operate and use, the production cost and the labor intensity of a worker are reduced, and a working environment of the worker is improved. In addition, the device is provided with a intelligent regulation system, and has waterproof, automatic alarming when device overrunning and power-off protection functions, and the field production safety of the dispersed particle gel is improved.

(4) According to the skid-mounted dispersed particle gel production device provided by the present invention, the dispersed particle gel may be rapidly prepared, preferred high-viscosity fluid pumps have forward fluid delivery and backward fluid delivery functions, and are beneficial for cyclic shearing of the dispersed particle gel, and have the characteristics of simplicity and convenience for operation.

(5) The partially hydrolyzed polyacrylamide, crosslinking agent, coagulant and stabilizer in the present invention are highly compatible, such a system may only undergo reaction for 5-8 h at a temperature of 90-95° C. to form bulk gel, and has the characteristics of rapid gel forming and energy consumption reduction.

BRIEF DESCRIPTION OF DRAWINGS

FIG. 1 is a specific skid-mounted dispersed particle gel production device according to the present invention.

DESCRIPTIONS FOR THE DRAWING REFERENCE SIGNS

1—jet blending system; 11—jet device; 12—feed funnel; 13—liquid water supply unit; 14—fixing base; 2—bulk gel chemical crosslinking reaction system; 21—reaction tank; 22—first high-viscosity fluid pump; 211—heating device; 3—shearing and grinding system; 4—storage system; 41—stirring tank; 42—second high-viscosity fluid pump; 5—intelligent regulation system; 51—jet blending system controller; 52—bulk gel chemical crosslinking reaction system controller; 53—shearing and grinding system controller; 54—storage system controller; 55—overcurrent protection device; 56—explosion-proof quick plug; 57—explosion-proof cabinet; V—safety valve; L—return

DETAILED DESCRIPTION OF THE EMBODIMENTS

Endpoints of ranges and any value disclosed in the present invention are not limited to exact ranges or values, and these ranges or values should be understood to include values close to these ranges or values. For numerical ranges, combinations may be formed between endpoint values of each range, between the endpoint values of each range and independent point values and between the independent point values to obtain one or more new numerical ranges, and these numerical ranges should be considered to be specifically disclosed in the present invention.

A first aspect of the present invention provides skid-mounted dispersed particle gel production device, sequentially comprising, in a delivery direction of a material flow, a jet blending system 1, a bulk gel chemical crosslinking reaction system 2, a shearing and grinding system 3 and a storage system 4, wherein the jet blending system 1 is configured to deliver a dispersed particle gel production raw material and liquid water into the bulk gel chemical crosslinking reaction system 2 in a jet manner and perform reaction to obtain a pre-dispersed particle gel;

the shearing and grinding system 3 is configured to receive the pre-dispersed particle gel from the bulk gel chemical crosslinking reaction system 2 and grind and shear it to obtain dispersed particle gel;

the storage system 4 is configured to receive the dispersed particle gel from the shearing and grinding system 3 and store it;

wherein the device further comprises an intelligent regulation system 5, configured to regulate the jet blending system 1, the bulk gel chemical crosslinking reaction system 2, the shearing and grinding system 3 and the storage system 4; and wherein the bulk gel chemical crosslinking reaction system 2 comprises a reaction tank 21, and a heating device 211 is further arranged in the reaction tank 21.

According to the present invention, the jet blending system 1 may comprise a jet device 11, and the jet device 11 is configured to jet the dispersed particle gel production raw material and the liquid water into the reaction tank 21 of the bulk gel chemical crosslinking reaction system 2. Wherein, jet power may be 10-50 KW.

In addition, the jet blending system 1 may further comprise a feed funnel 12 and a liquid water supply unit 13. Wherein, the feed funnel 12 is configured to deliver the dispersed particle gel production raw material to the jet device 11, and the liquid water supply unit 13 is configured to deliver the liquid water to the jet device 11.

Preferably, the jet blending system 1 further comprises a fixing base 14, and the fixing base 14 may effectively fix the jet blending system 1 on a skid.

Preferably, a liquid outlet of the jet blending system 1 is connected with a liquid inlet of the reaction tank 21 through a pipeline, thereby enabling the reaction tank 21 to receive the dispersed particle gel production raw material and the liquid water from the jet blending system 1.

According to the present invention, the heating device 211 may increase a temperature of the reaction tank 21 to a predetermined temperature, for example, 90-95° C., enable the components of the dispersed particle gel production raw material to react, thereby obtaining the pre-dispersed particle gel. Wherein, the heating device 211 may be any well-known device capable of heating the reaction tank in the art, and for example, may be a resistance wire arranged on an inner wall of the reaction tank 21.

Preferably, the bulk gel chemical crosslinking reaction system 2 further comprises a first high-viscosity fluid pump 22. The first high-viscosity fluid pump 22 may provide sufficient power for delivery of the pre-dispersed particle gel to the shearing and grinding system 3. The first high-viscosity fluid pump 22 may be arranged in the vicinity of a discharge port of the reaction tank 21, and may also be arranged on a material delivery pipeline between the bulk gel chemical crosslinking reaction system 2 and the shearing and grinding system 3.

According to the present invention, the shearing and grinding system 3 may be any device capable of shearing the pre-dispersed particle gel to form dispersed particle gel in different scale distributions in the art, and for example, may be a colloid mill.

According to the present invention, the storage system 4 may comprise a stirring tank 41 and a second high-viscosity fluid pump 42. Wherein, the stirring tank 41 may keep the prepared dispersed particle gel in a homogeneous state, and the second high-viscosity fluid pump 42 may be configured to provide sufficient power to pump the dispersed particle gel in the shearing and grinding system 3 into the stirring tank 41. Wherein, the second high-viscosity fluid pump 42 may be arranged in the vicinity of the stirring tank 41, and may also be arranged on a material delivery pipeline between the shearing and grinding system 3 and the stirring tank 41.

According to the present invention, for obtaining dispersed particle gel with higher performance, both of the first high-viscosity fluid pump 22 and the second high-viscosity fluid pump 42 are preferably high-viscosity fluid pumps capable of implementing bidirectional delivery, thereby bidirectionally delivering the material flow in the bulk gel chemical crosslinking reaction system 2, the shearing and grinding system 3 and the storage system 4. For example, after the reaction raw material completes reaction in the bulk gel chemical crosslinking reaction system 2, the obtained pre-dispersed particle gel may be delivered to the shearing and grinding system 3 by forward delivery of the first high-viscosity fluid pump 22, and after shearing is completed in the shearing and grinding system 3, the obtained dispersed particle gel is delivered to the storage system 4 by forward delivery of the second high-viscosity fluid pump 42, thereby completing primary shearing. In addition, the dispersed particle gel in the storage system 4 may further be delivered to the shearing and grinding system 3 for shearing through backward delivery of the second high-viscosity fluid pump 42, and after shearing is completed, the sheared material is delivered to the bulk gel chemical crosslinking reaction system 2 through backward delivery of the first high-viscosity fluid pump 22, thereby completing second shearing. Wherein, the number of shearing times may be 2-6.

Alternatively, return pipelines can be further arranged between the bulk gel chemical crosslinking reaction system 2 and the shearing and grinding system 3 and between the shearing and grinding system 3 and the storage system 4, and the high-viscosity fluid pumps are arranged on the return pipelines. the material may be backwards delivered among the bulk gel chemical crosslinking reaction system 2, the shearing and grinding system 3 and the storage system 4 through the return pipelines, thereby cycle shearing is completed.

According to a preferred embodiment of the present invention, safety valves V are arranged at all of the connecting pipes of the jet blending system 1, the bulk gel chemical crosslinking reaction system 2, the shearing and grinding system 3, the storage system 4. By the safety valves V, ordered and safe implementation of polymer solution aging, bulk gel chemical crosslinking reaction, fluid delivery and shearing and grinding of the dispersed particle gel can be ensured.

According to the present invention, the intelligent regulation system 5 preferably comprises a jet blending system controller 51, a bulk gel chemical crosslinking reaction system controller 52, a shearing and grinding system controller 53, a storage system controller 54, an overcurrent protection device 55, explosion-proof quick plugs 56 and an explosion-proof cabinet 57. Wherein, connections between the jet blending system controller 51 and the jet blending system 1, between the bulk gel chemical crosslinking reaction system controller 52 and the bulk gel chemical crosslinking reaction system 2, between the shearing and grinding system controller 53 and the shearing and grinding system 3 and between the storage system controller 54 and the storage system 4 may be implemented through the explosion-proof quick plugs 56. The system has waterproof, automatic alarming when device overrunning and power-off protection functions. More importantly, running of any other system may be controlled in order through the intelligent regulation system 5, thereby ensuring ordered and safe production.

Wherein, through the explosion-proof quick plugs, safe running of each system can be ensured, and in addition, quick connection of the systems is also facilitated.

According to the present invention, all of the jet blending system 1, the bulk gel chemical crosslinking reaction system 2, the shearing and grinding system 3, the storage system 4 and the intelligent regulation system 5 are arranged on a skid to facilitate movement of the device, and during use, only connecting pipelines and cables is needed to meet skid-mounted online continuous production of the dispersed particle gel.

According to a second aspect of the present invention, a preparation method for dispersed particle gel is provided.

Wherein, the method is implemented in the abovementioned device. Specifically, the method comprising:

(1) delivering partially hydrolyzed polyacrylamide and liquid water into a jet blending system 1, then jetting them into a bulk gel chemical crosslinking reaction system 2 and mixing them to obtain an aqueous solution of the partially hydrolyzed polyacrylamide;

(2) delivering a crosslinking agent, a coagulant and a stabilizer into the jet blending system 1 and jetting them into the bulk gel chemical crosslinking reaction system 2 to allow contact with the aqueous solution of the partially hydrolyzed polyacrylamide to obtain a bulk gel forming solution;

(3) increasing temperature to a predetermined temperature by use of a heating device in the bulk gel chemical crosslinking reaction system 2, and aging the obtained bulk gel forming solution at the predetermined temperature to obtain pre-dispersed particle gel; and (4) performing primary shearing on the obtained pre-dispersed particle gel in a shearing and grinding system 3 to obtain the dispersed particle gel, wherein a relative molecular weight of the partially hydrolylzed polyacrylamide is 6-10 million; and the crosslinking agent is a resin crosslinking agent, the coagulant is an alcohol amine coagulant, and the stabilizer is thiourea.

As mentioned above, the method of the present invention can be implemented under a medium/high-temperature oil reservoir condition, and in addition, can be used for continuous production in a complex environment such as a tidal flat, a hill and an offshore work platform. In addition, in the present invention, the partially hydrolyzed polyacrylamide with a specific relative molecular weight is compounded with the resin crosslinking agent, the alcohol amine coagulant and the thiourea stabilizer, so that bulk gel may be formed more rapidly with a lower polyacrylamide concentration.

According to the present invention, as long as the partially hydrolyzed polyacrylamide with a specific relative molecular weight is compounded with the resin crosslinking agent, the alcohol amine coagulant and the thiourea stabilizer, a bulk gel system and dispersed particle gel with high performance can be obtained. For obtaining a bulk gel system and dispersed particle gel with higher performance, preferably, based on the total weight of 100 parts of the bulk gel forming solution, a dose of the partially hydrolyzed polyacrylamide is 0.3 to 0.6 part by weight, a dose of the crosslinking agent is 0.6 to 1.5 parts by weight, a dose of the coagulant is 0.3 to 1 part by weight and a dose of the stabilizer is 0.01 to 0.05 part by weight.

More preferably, based on the total weight of 100 parts of the bulk gel forming solution, a dose of the partially hydrolyzed polyacrylamide is 0.3 to 0.6 part by weight, a dose of the crosslinking agent is 0.9 to 1.2 parts by weight, a dose of the coagulant is 0.5 to 0.8 part by weight and a dose of the stabilizer is 0.02 to 0.04 part by weight.

According to the present invention, the relative molecular weight of the polyacrylamide adopted in the present invention is required to be within the range of 6 to 10 million g/mol; if the relative molecular weight is lower than 6 million g/mol, gel forming time of the formed bulk gel is long and a gel forming intensity is low; and if the relative molecular weight is higher than 10 million g/mol, a viscosity of a polymer solution is excessively high and thus the substance may not be uniformly dispersed. Therefore, the relative molecular weight of the polyacrylamide is 6 to 10 million g/mol, preferably 8.5 to 10 million g/mol and more preferably 9 to 10 million g/mol.

The polyacrylamide is partially hydrolyzed polyacrylamide, the partially hydrolyzed polyacrylamide is a nonionic polymer, and a hydrolysis degree thereof is 3-10%, preferably 3-6%. The hydrolysis degree refers to a molar percentage content of hydrolyzed structural units in the polyacrylamide in all structural units in the polyacrylamide According to the present invention, the resin crosslinking agent is preferably a phenolic resin prepolymer. The resin crosslinking agent adopted in the present invention is usually commercially available and an effective content thereof may be 40-60 weight percent, that is, a content of components except a solvent is 40-60 weight percent. The content of the resin crosslinking agent in the present invention refers to its effective content.

According to the present invention, the alcohol amine coagulant may be selected from multiple alcohol amine coagulants, and is preferably one or more of triethanolamine, triisopropanolamine and triisobutanolamine. Wherein, the alcohol amine coagulant, particularly the triethanolamine, may act more effectively to shorten the gel forming time. Therefore, with the adoption of the alcohol amine coagulant, particularly the triethanolamine, as the coagulant, a bulk gel system with relatively stronger strength may be obtained by adopting a smaller amount of coagulant.

According to the present invention, each component in the composition may be obtained by a conventional approach in the art, for example, may be prepared by a conventional method in the art, or is commercially available.

According to the present invention, the partially hydrolyzed polyacrylamide and the liquid water are added into the bulk gel chemical crosslinking reaction system 2 in a jet manner to prepare a aqueous solution, then the crosslinking agent, the coagulant and the stabilizer are jetted to form the bulk gel, and then aging is performed. Therefore, the forming time of the dispersed particle gel may be effectively shortened.

Wherein, in Step (1), a manner for mixing the partially hydrolyzed polyacrylamide and the liquid water in the bulk gel chemical crosslinking reaction system 2 is preferably stirring mixing, and stirring time may be 30-60 min.

In Step (2), the prepared aqueous solution may also contact with the crosslinking agent, the coagulant and the stabilizer to form the bulk gel under a stirring condition, and stirring time may be 10-20 min. Wherein, the bulk gel may be formed at a normal temperature, for example, 20-40° C. Wherein an addition sequence of the crosslinking agent, the coagulant and the stabilizer may not be specifically limited and may be selected by those skilled in the art according to a practical condition.

According to the present invention, for ensuring effective formation of the bulk gel and ensuring the property of the subsequent dispersed particle gel, a jet device may jet each substance with the power of 10-50 KW.

According to the present invention, in Step (3), a reaction tank may be heated to a predetermined temperature under the action of a heating device, thereby implementing reaction of a medium/high-temperature bulk gel system. The predetermined temperature may be 90-95° C.

According to the present invention, aging time may be shortened to be 5-8 h.

According to the present invention, in Step (4), preferably, shearing is performed in a colloid mill, a rotating speed is 1,000-3,000 rpm (for example, 2,500-3,000 rpm), a shearing interval is 10-170 μm (for example, 10-50 μm), and shearing time is 3-15 min (for example, 5-10 min).

According to the present invention, the method of the present invention further preferably comprises that the dispersed particle gel obtained in Step (3) is delivered to a storage system 4 for storage.

Preferably, for obtaining dispersed particle gel with higher performance, the method further comprises that the dispersed particle gel in the storage system 4 is returned to the shearing and grinding system 3 for second shearing (shearing is implemented once every time when the dispersed particle gel passes through the shearing and grinding system 3 once), and a second shearing product is returned to the bulk gel chemical crosslinking reaction system 2.

Wherein, the number of shearing times may be 2-6.

A third aspect of the present invention provides a dispersed particle gel obtained by the abovementioned preparation method.

According to the present invention, a particle size of the dispersed particle gel is preferably 0.5-10 μm more preferably 0.8-2.5 μm, and a viscosity is preferably 5-10 mPa·, more preferably 7-8 mPa·s.

A fourth aspect of the present invention provides usage of the abovementioned device and/or dispersed particle gel to oilfield profile control and displacement.

A method for oilfield profile control and displacement, comprising during a process of oilfield profile control and displacement, using the dispersed particle gel obtained by the abovementioned preparation method.

A method for oilfield profile control and displacement, comprising during a process of oilfield profile control and displacement, using the dispersed particle gel prepared by the abovementioned device.

The present invention will be described in detail below through examples.

The resin crosslinking agent is a phenolic resin prepolymer solution purchased from Shengli Oilfield Shengli Chemicals Co., Ltd., and the effective content is 50 weight percent.

In the following examples, the partially hydrolyzed polyacrylamide is purchased from Shandong Shida Oilfield Technical Services Co., Ltd.

In the following examples, the particle size of the dispersed particle gel is tested by a Bettersize 2000 type laser particle size analyzer from Dandong Bettersize Instruments Ltd., and the viscosity is tested by a Brookfield viscometer.

The following examples are implemented in the following skid-mounted dispersed particle gel production device. A structure of the skid-mounted dispersed particle gel production device is shown in FIG. 1, and comprises five parts, i.e., a jet blending system 1, a bulk gel chemical crosslinking reaction system 2, a shearing and grinding system 3, a storage system 4 and an intelligent regulation system 5.

Wherein, the jet blending system 1 comprises a jet device 11, a feed funnel 12, a liquid water supply unit 13 and a fixing base 14. A liquid inlet of the jet device 11 is connected with the feed funnel 12 and the liquid water supply unit 13.

The bulk gel chemical crosslinking reaction system 2 comprises a reaction tank 21 and a first high-viscosity fluid pump 22. A heating device 211 (heating resistor) is circumferentially arranged on an inner wall of the reaction tank 21. A liquid outlet of the jet device 11 is connected with a liquid inlet of the reaction tank 21 through a material delivery pipeline, and a liquid outlet of the reaction tank 21 is connected with a liquid inlet of the shearing and grinding system 3 through the first high-viscosity fluid pump 22. Wherein, the first high-viscosity fluid pump 22 is arranged on a material delivery pipeline between the reaction tank 21 and the shearing and grinding system 3.

The shearing and grinding system 3 is a colloid mill.

The storage system 4 comprises a stirring tank 41 and a second high-viscosity fluid pump 42. A liquid inlet of the stirring tank 41 is connected with the colloid mill through the second high-viscosity fluid pump 42. Wherein, the second high-viscosity fluid pump 42 is arranged on a material delivery pipeline between the colloid mill and the stirring tank 41.

The intelligent regulation system 5 comprises a jet blending system controller 51, a bulk gel chemical crosslinking reaction system controller 52, a shearing and grinding system controller 53, a storage system controller 54, an overcurrent protection device 55, explosion-proof quick plugs 56 and an explosion-proof cabinet 57. Wherein, connections between the jet blending system controller 51 and the jet blending system 1, between the bulk gel chemical crosslinking reaction system controller 52 and the bulk gel chemical crosslinking reaction system 2, between the shearing and grinding system controller 53 and the shearing and grinding system 3 and between the storage system controller 54 and the storage system 4 are implemented through the explosion-proof quick plugs 56.

Wherein, both of the first high-viscosity fluid pump 22 and the second high-viscosity fluid pump 42 are bidirectional delivery high-viscosity fluid pumps.

Wherein, safety valves V are arranged on the jet blending system 1, the bulk gel chemical crosslinking reaction system 2, the shearing and grinding system 3, the storage system 4 and connecting pipelines between adjacent systems.

Wherein, all of the jet blending system 1, the bulk gel chemical crosslinking reaction system 2, the shearing and grinding system 3, the storage system 4 and the intelligent regulation system 5 are arranged on a skid.

Example 1

The example is adopted to describe a preparation method for dispersed particle gel disclosed by the present invention.

(1), partially hydrolyzed polyacrylamide with a relative molecular weight of 9.85 million g/mol and a hydrolysis degree of 3.8% is selected, and the partially hydrolyzed polyacrylamide and liquid water are added into the jet device 11, jetted to the reaction tank 21 and stirred for 40 min to prepare a 0.3% in mass fraction solution of the partially hydrolyzed polyacrylamide.

(2), a phenolic resin prepolymer crosslinking agent, a triethanolamine coagulant and a thiourea stabilizer are sequentially added into the mixed solution of the partially hydrolyzed polyacrylamide and the water prepared in Step (1) through the jet device 11, the adding amount of phenolic resin prepolymer crosslinking agent allows its mass fractio is 0.9%, the adding amount of triethanolamine coagulant allows its mass fractio is 0.6%, the adding amount of thiourea stabilizer allows its mass fractio is 0.03%, and the mixed solution in the reaction tank 21 is stirred and dispersed for 10 min at a room temperature to prepare a bulk gel forming solution.

(3), the heating device 211 is started to keep aging reaction for 8 h at a temperature controlled to be 95° C. to obtain a bulk gel system for preparation of the dispersed particle gel.

(4), the first high-viscosity fluid pump 22 is started forwards to deliver the bulk gel system prepared in Step (3) to the colloid mill, a rotating speed of the colloid mill being regulated to be 2,500 rpm, a shearing interval being 30 μm and shearing time being 8 min; and meanwhile, the second high-viscosity fluid pump 42 is started forwards to deliver the prepared dispersed particle gel to the stirring tank 41 to complete a first cycle.

(5), the second high-viscosity fluid pump 42 is started backwards to deliver the dispersed particle gel prepared in the first cycle in Step (4) to the colloid mill, the rotating speed of the colloid mill being regulated to be 2,500 rpm, the shearing interval being 30 μm and the shearing time being 8 min; and meanwhile, the first high-viscosity fluid pump 22 is started backwards to deliver the prepared dispersed particle gel to the reaction tank 21 to complete a second cycle.

(6), Step (4) is repeated to complete a third cycle.

(7), Step (5) is repeated to complete a fourth cycle.

A particle size and viscosity of the obtained dispersed particle gel are shown in Table 1.

Example 2

The example is adopted to describe a preparation method for dispersed particle gel provided by the present invention.

(1), partially hydrolyzed polyacrylamide with a relative molecular weight of 9.05 million g/mol and a hydrolysis degree of 4.5% is selected, and the partially hydrolyzed polyacrylamide and liquid water are added into the jet device 11, jetted to the reaction tank 21 and stirred for 30 min to prepare a 0.4% in mass fraction solution of the partially hydrolyzed polyacrylamide.

(2), a phenolic resin prepolymer crosslinking agent, a triethanolamine coagulant and a thiourea stabilizer are sequentially added into the mixed solution of the partially hydrolyzed polyacrylamide and the water prepared in Step (1) through the jet device 11, the adding amount of phenolic resin prepolymer crosslinking agent allows its mass fractio is 1.0%, the adding amount of triethanolamine coagulant allows its mass fractio is 0.5%, the adding amount of thiourea stabilizer allows its mass fractio is 0.04%, and the mixed solution in the reaction tank 21 is stirred and dispersed for 15 min at a room temperature to prepare a bulk gel forming solution.

(3), the heating device 211 is started to keep aging reaction for 6 h at a temperature controlled to be 92° C. to obtain a bulk gel system for preparation of the dispersed particle gel.

(4), the first high-viscosity fluid pump 22 is started forwards to deliver the bulk gel system prepared in Step (3) to the colloid mill, a rotating speed of the colloid mill being regulated to be 2,800 rpm, a shearing interval being 10 μm and shearing time being 10 min; and meanwhile, the second high-viscosity fluid pump 42 is started forwards to deliver the prepared dispersed particle gel to the stirring tank 41 to complete a first cycle.

In (5), the second high-viscosity fluid pump 42 is started backwards to deliver the dispersed particle gel prepared in the first cycle in Step (4) to the colloid mill, the rotating speed of the colloid mill being regulated to be 2,800 rpm, the shearing interval being 10 μm and the shearing time being 10 min; and meanwhile, the first high-viscosity fluid pump 22 is started backwards to deliver the prepared dispersed particle gel to the reaction tank 21 to complete a second cycle.

(6), Step (4) is repeated to complete a third cycle.

(7), Step (5) is repeated to complete a fourth cycle.

(8), Step (4) is repeated to complete a fifth cycle.

(9), Step (5) is repeated to complete a sixth cycle.

A particle size and viscosity of the obtained dispersed particle gel are shown in Table 1.

Example 3

The example is adopted to describe a preparation method for dispersed particle gel provided by the present invention.

(1), partially hydrolyzed polyacrylamide with a relative molecular weight of 9.42 million g/mol and a hydrolysis degree of 5.7% is selected, and the partially hydrolyzed polyacrylamide and liquid water are added into the jet device 11, jetted to the reaction tank 21 and stirred for 60 min to prepare a 0.6% in mass fraction solution of the partially hydrolyzed polyacrylamide.

(2), a phenolic resin prepolymer crosslinking agent, a triethanolamine coagulant and a thiourea stabilizer are sequentially added into the mixed solution of the partially hydrolyzed polyacrylamide and the water prepared in Step (1) through the jet device 11, the adding amount of phenolic resin prepolymer crosslinking agent allows its mass fractio is 1.2%, the adding amount of triethanolamine coagulant allows its mass fractio is 0.8%, the adding amount of thiourea stabilizer allows its mass fraction is 0.02%, and the mixed solution in the reaction tank 21 is stirred and dispersed for 20 min at a room temperature to prepare a bulk gel forming solution.

(3), the heating device 211 is started to keep aging reaction for 5 h at a temperature controlled to be 90° C. to obtain a bulk gel system for preparation of the dispersed particle gel.

(4), the first high-viscosity fluid pump 22 is started forwards to deliver the bulk gel system prepared in Step (3) to the colloid mill, a rotating speed of the colloid mill being regulated to be 3,000 rpm, a shearing interval being 50 μm and shearing time being 5 min; and meanwhile, the second high-viscosity fluid pump 42 is started forwards to deliver the prepared dispersed particle gel to a stirring tank 41 to complete a first cycle.

(5), the second high-viscosity fluid pump 42 is started backwards to deliver the dispersed particle gel prepared in the first cycle in Step (4) to the colloid mill, the rotating speed of the colloid mill being regulated to be 3,000 rpm, the shearing interval being 50 μm and the shearing time being 5 min; and meanwhile, the first high-viscosity fluid pump 22 is started backwards to deliver the prepared dispersed particle gel to the reaction tank 21 to complete a second cycle.

(6), Step (4) is repeated to complete a third cycle.

(7), Step (5) is repeated to complete a fourth cycle.

(8), Step (4) is repeated to complete a fifth cycle.

(9), Step (5) is repeated to complete a sixth cycle.

A particle size and viscosity of the obtained dispersed particle gel are shown in Table 1.

Example 4

The example is adopted to describe a preparation method for dispersed particle gel provided by the present invention.

The dispersed particle gel is prepared according to the method of example 1, and the difference is that the coagulant is triisopropanolamine. A particle size and viscosity of the obtained dispersed particle gel are shown in Table 1.

Example 5

The example is adopted to describe a preparation method for dispersed particle gel provided by the present invention.

The dispersed particle gel is prepared according to the method of example 1, and the difference is that shearing is performed only once. A particle size and viscosity of the obtained dispersed particle gel are shown in Table 1.

Example 6

The example is adopted to describe a preparation method for dispersed particle gel provided by the present invention.

The dispersed particle gel is prepared according to the method of example 1, and the difference is that the relative molecular weight of the polyacrylamide is 6 million g/mol. A particle size and viscosity of the obtained dispersed particle gel are shown in Table 1.

Example 7

The example is adopted to describe a preparation method for dispersed particle gel provided by the present invention.

The dispersed particle gel is prepared according to the method of example 1, and the difference is that, in Step (2), the mass fraction of the phenolic resin prepolymer crosslinking agent is 1.5%, the mass fraction of the triethanolamine coagulant is 0.3% and the mass fraction of the thiourea stabilizer is 0.05%. A particle size and viscosity of the obtained dispersed particle gel are shown in Table 1.

Example 8

The example is adopted to describe a preparation method for dispersed particle gel provided by the present invention.

The dispersed particle gel is prepared according to the method of example 1, and the difference is that, in Step (2), the mass fraction of the phenolic resin prepolymer crosslinking agent is 0.6%, the mass fraction of the triethanolamine coagulant is 1.0% and the mass fraction of the thiourea stabilizer is 0.01%. A particle size and viscosity of the obtained dispersed particle gel are shown in Table 1.

Example 9

The example is adopted to describe a preparation method for dispersed particle gel provided by the present invention.

The dispersed particle gel is prepared according to the method of example 1, and the difference is that the relative molecular weight of the polyacrylamide is 12 million g/mol. A particle size and viscosity of the obtained dispersed particle gel are shown in Table 1.

Example 10

The example is adopted to describe a preparation method for dispersed particle gel provided by the present invention.

The dispersed particle gel is prepared according to the method of example 1, and the difference is that no thiourea is added and the aging time is prolonged to 15 h. A particle size and viscosity of the obtained dispersed particle gel are shown in Table 1.

TABLE 1

|  | Particle size (µm) | Viscosity (mPa·s) |
| --- | --- | --- |
| Example 1 | 0.81 | 9.6 |
| Example 2 | 1.2 | 8.7 |
| Example 3 | 2.3 | 7.5 |
| Example 4 | 0.85 | 9.2 |
| Example 5 | 3.5 | 16.7 |
| Example 6 | 2.7 | 10.3 |
| Example 7 | 2.9 | 8.2 |
| Example 8 | 0.67 | 6.9 |
| Example 9 | 1.2 | 14.5 |
| Example 10 | 1.3 | 10.5 |

From Table 1, it can be seen that the device of the present invention may be used for implementing reaction of a medium/high-temperature bulk gel system, and the device of the present invention is skid-mounted and may be applied to continuous production in a complex environment such as a tidal flat, a hill and an offshore work platform. Moreover, the partially hydrolyzed polyacrylamide, crosslinking agent, coagulant and stabilizer in the present invention are highly compatible, and may react for 5-8 h to form the bulk gel, so that rapid gel forming is ensured.

The above is detailed description about the preferred implementation modes of the present invention but not intended to limit the present invention. Various simple transformations, including combinations of each technical characteristic in any other manner, may be made to the technical solutions of the present invention within the scope of the technical concept of the present invention, and these simple transformations and combinations are also considered as contents disclosed by the present invention and shall also fall within the scope of protection of the present invention.

The invention claimed is:

1. A preparation method for dispersed particle gel, wherein the method is performed in a skid-mounted dispersed particle gel production device that sequentially comprises, in a delivery direction of a material flow, a jet blending system, a bulk gel chemical crosslinking reaction system, a shearing and grinding system and a storage system, wherein the jet blending system is configured to deliver a dispersed particle gel production raw material and liquid water into the bulk gel chemical crosslinking reaction system in a jet manner and perform reaction to obtain a pre-dispersed particle gel; the shearing and grinding system is configured to receive the pre-dispersed particle gel from the bulk gel chemical crosslinking reaction system and grind and shear it to obtain dispersed particle gel; the storage system is configured to receive the dispersed particle gel from the shearing and grinding system and store it; wherein the device further comprises an intelligent regulation system, configured to regulate the jet blending system, the bulk gel chemical crosslinking reaction system, the shearing and grinding system and the storage system; and wherein the bulk gel chemical crosslinking reaction system comprises a reaction tank, and a heating device is further arranged in the reaction tank;

the method comprising:
(1) delivering partially hydrolyzed polyacrylamide and liquid water into a jet blending system, then jetting them into a bulk gel chemical crosslinking reaction system and mixing them to obtain an aqueous solution of the partially hydrolyzed polyacrylamide;
(2) delivering a crosslinking agent, a coagulant and a stabilizer into the jet blending system and jetting them into the bulk gel chemical crosslinking reaction system to allow contact with the aqueous solution of the partially hydrolyzed polyacrylamide to obtain a bulk gel forming solution;

(3) increasing temperature to a predetermined temperature by use of a heating device in the bulk gel chemical crosslinking reaction system, and aging the obtained bulk gel forming solution at the predetermined temperature to obtain pre-dispersed particle gel; and (4) performing primary shearing on the obtained pre-dispersed particle gel in a shearing and grinding system to obtain the dispersed particle gel, wherein a relative molecular weight of the partially hydrolylzed polyacrylamide is 6-10 million; and the crosslinking agent is a resin crosslinking agent, the coagulant is an alcohol amine coagulant, and the stabilizer is thiourea.

2. The method according to claim 1, wherein based on the total weight of 100 parts of the bulk gel forming solution, a dose of the partially hydrolyzed polyacrylamide is 0.3 to 0.6 part by weight, a dose of the crosslinking agent is 0.6 to 1.5 parts by weight, a dose of the coagulant is 0.3 to 1 part by weight and a dose of the stabilizer is 0.01 to 0.05 part by weight.

3. The method according to claim 1, wherein the resin is a phenolic resin prepolymer; and the alcohol amine is one or more of triethanolamine, triisopropanolamine and triisobutanolamine.

4. The method according to claim 1, wherein a hydrolysis degree of the partially hydrolyzed polyacrylamide is 3-6%.

5. The method according to claim 1, wherein in Step (1), the mixing is stirring mixing, and stirring time is 30-60 min.

6. The method according to claim 1, wherein in Step (2), the contact is stirring contact, and a contact temperature is 20-40° C., a contact time is 10-20 min.

7. The method according to claim 1, wherein in Step (3), the predetermined temperature is 90-95° C., and the aging time is 5-8 h.

8. The method according to claim 1, wherein in Step (4), the grinding system is a colloid mill, operating conditions comprise a rotating speed 1,000-3,000 rpm, a shearing interval 10-170 μm, and a shearing time 3-15 min.

9. The method according to claim 1, further comprising delivering the dispersed particle gel obtained in Step (3) to a storage system (4) for storage, and the method further comprising: returning the dispersed particle gel in the storage system to the shearing and grinding system for second shearing and returning a second shearing product to the bulk gel chemical crosslinking reaction system, wherein the number of shearing times is 2-6.

10. A method for oilfield profile control and displacement, comprising during a process of oilfield profile control and displacement, using the dispersed particle gel prepared according to the method of claim 1.

11. The method according to claim 1, wherein the jet blending system comprises a jet device, a feed funnel and a liquid water supply unit, and the feed funnel and the liquid water supply unit are configured to deliver the dispersed particle gel production raw material and the liquid water to the jet device respectively.

12. The method according to claim 1, wherein the bulk gel chemical crosslinking reaction system further comprises a first high-viscosity fluid pump; and wherein the reaction tank is configured to receive the dispersed particle gel production raw material and liquid water from the jet blending system and perform reaction to obtain the pre-dispersed particle gel, and the first high-viscosity fluid pump is configured to pump the pre-dispersed particle gel to the shearing and grinding system.

13. The method according to claim 1, wherein the shearing and grinding system is a colloid mill.

14. The method according to claim 1, wherein the storage system comprises a stirring tank and a second high-viscosity fluid pump, and the second high-viscosity fluid pump is configured to pump the dispersed particle gel in the shearing and grinding system into the stirring tank.

15. The method according to claim 1, wherein the intelligent regulation system comprises a jet blending system controller, a bulk gel chemical crosslinking reaction system controller, a shearing and grinding system controller, a storage system controller, an overcurrent protection device, explosion-proof quick plugs and an explosion-proof cabinet; and wherein connections between the jet blending system controller and the jet blending system, between the bulk gel chemical crosslinking reaction system controller and the bulk gel chemical crosslinking reaction system, between the shearing and grinding system controller and the shearing and grinding system and between the storage system controller and the storage system are implemented through the explosion-proof quick plugs.

16. The method according to claim 12, wherein the first high-viscosity fluid pump is a high-viscosity fluid pump capable of implementing bidirectional delivery; or, return pipelines are further arranged between the bulk gel chemical crosslinking reaction system and the shearing and grinding system.

17. The method according to claim 14, wherein the second high-viscosity fluid pump is a high-viscosity fluid pump capable of implementing bidirectional delivery; or, return pipelines are further arranged between the shearing and grinding system and the storage system.

* * * * *